(12) United States Patent
Narasimhan et al.

(10) Patent No.: US 11,967,060 B2
(45) Date of Patent: Apr. 23, 2024

(54) WAFER LEVEL SPATIAL SIGNATURE GROUPING USING TRANSFER LEARNING

(71) Applicant: KLA CORPORATION, Milpitas, CA (US)

(72) Inventors: Narayani Narasimhan, New Delhi (IN); Alán Dávila, Pflugerville, TX (US); P. Jithendra Kumar Reddy, Hyderabad (IN); Ski Sim, Singapore (SG); Osamu Yamamoto, Kanagawa (JP)

(73) Assignee: KLA CORPORATION, Milpitas, CA (US)

( * ) Notice: Subject to any disclaimer, the term of this patent is extended or adjusted under 35 U.S.C. 154(b) by 345 days.

(21) Appl. No.: 17/405,014

(22) Filed: Aug. 17, 2021

(65) Prior Publication Data

US 2022/0067911 A1    Mar. 3, 2022

Related U.S. Application Data

(60) Provisional application No. 63/089,036, filed on Oct. 8, 2020.

(30) Foreign Application Priority Data

Aug. 25, 2020   (IN) .............................. 202041036573

(51) Int. Cl.
*G06T 7/00*    (2017.01)
(52) U.S. Cl.
CPC .. *G06T 7/0004* (2013.01); *G06T 2207/20081* (2013.01); *G06T 2207/20084* (2013.01); *G06T 2207/30148* (2013.01)

(58) Field of Classification Search
CPC . G06T 2207/20081; G06T 2207/30148; G06T 2207/20084; G06T 7/0004; G06N 20/00; G06V 10/764
See application file for complete search history.

(56) References Cited

U.S. PATENT DOCUMENTS

| 6,718,526 B1 | 4/2004 | Eldredge et al. |
| 10,360,477 B2 | 7/2019 | Bhaskar et al. |
| 10,713,534 B2 | 7/2020 | Brauer |
| 2008/0281545 A1* | 11/2008 | McIntyre ........... G01R 31/2894 702/119 |

(Continued)

FOREIGN PATENT DOCUMENTS

KR    20190081710 A    7/2019

OTHER PUBLICATIONS

Simonyan & Zisserman, "Very Deep Convolutional Networks for Large-Scale Image Recognition," 2015, Int'l Conf. on Learning Representations, 14 pages.

(Continued)

*Primary Examiner* — Sang H Nguyen
(74) *Attorney, Agent, or Firm* — Hodgson Russ LLP

(57) ABSTRACT

A wafer map is classified using the machine learning based model and a signature on the wafer map. The machine learning based model uses transfer learning. The machine learning based model can be trained using images from various sources that are extracted and augmented and their features extracted. These extracted features can be classified into defects that occur during semiconductor manufacturing.

18 Claims, 7 Drawing Sheets

(56) References Cited

U.S. PATENT DOCUMENTS

| | | | |
|---|---|---|---|
| 2014/0335631 A1* | 11/2014 | Hessinger | H01L 22/20 |
| | | | 702/181 |
| 2015/0154746 A1* | 6/2015 | Zafar | G03F 1/84 |
| | | | 382/149 |
| 2015/0187060 A1 | 7/2015 | Hayashi | |
| 2017/0193400 A1 | 7/2017 | Bhaskar et al. | |
| 2018/0107928 A1 | 4/2018 | Zhang et al. | |
| 2018/0321168 A1* | 11/2018 | Sah | G01N 23/2251 |
| 2019/0073566 A1 | 3/2019 | Brauer | |
| 2019/0096659 A1* | 3/2019 | Xu | G06F 9/30003 |
| 2019/0139210 A1 | 5/2019 | Kondo et al. | |
| 2019/0347527 A1* | 11/2019 | Bhaviripudi | G06F 18/24 |
| 2020/0105500 A1 | 4/2020 | Chou et al. | |
| 2020/0226742 A1* | 7/2020 | Sawlani | H01L 21/67288 |
| 2020/0312778 A1* | 10/2020 | Lim | G06T 7/0008 |

OTHER PUBLICATIONS

WIPO, ISR for International Application No. PCT/US2021/047223, Dec. 1, 2021.

\* cited by examiner

WAFER LEVEL SPATIAL SIGNATURE GROUPING USING TRANSFER LEARNING

CROSS-REFERENCE TO RELATED APPLICATIONS

This application claims priority to the Indian patent application filed Aug. 25, 2020 and assigned App. No. 202041036573 and to the U.S. provisional patent application filed Oct. 8, 2020 and assigned U.S. App. No. 63/089,036, the disclosures of which are hereby incorporated by reference.

FIELD OF THE DISCLOSURE

This disclosure relates to semiconductor manufacturing.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation.

Most monolithic integrated circuits are fabricated as batches of devices on a wafer. By having many such devices on a single wafer, the devices are easier to handle and fabrication costs can be reduced. Because the functional elements within each of the devices tend to be extremely small, they can be easily damaged. For example, particulate matter can be detrimental to a device, regardless of whether that particulate matter is airborne or liquid-borne. Any particles landing on the surface of the wafer, if they are not removed in a timely manner, may interfere with the fabrication process and cause the device to fail. In a similar fashion, scratches and other physical interferences with the desired fabrication process may also cause the devices to fail.

Because it is so important that the causes of such physical anomalies (e.g., defects) be identified and corrected as soon as possible, wafers are typically given a physical inspection at various stages of the fabrication cycle. Inspection systems try to determine not only the type of defect (e.g., scratches or particulate matter), but also the source of the defect. In many cases the type of defect and the pattern of the defect can provide clues as to the source of the defect. Typically, such inspections have been done manually by a trained technician or engineer who studies one or more of the wafers under a microscope of some kind, searching for defects and trying to determine their origin based on experience.

Manual inspection of each wafer is cumbersome and the results may be inaccurate and inconsistent due to factors such as fatigue, inexperience, or carelessness. Manual inspection also is impractical in a manufacturing setting because of the high volumes of wafers that are involved. Spatial signature analysis provides the ability to automatically track problems in an integrated circuit wafer process. Spatial signature analysis can be performed on wafers at different stages of the fabrication process to detect certain patterns of defects on them. Identified patterns can be mapped to a different process that the wafer underwent. For example, a defective CMP process may cause long curved scratches. Thus, process problems can be detected automatically, without resorting to the scrutiny of a subset of the microscopic defects, which typically requires a scanning electron microscope review. This, in turn, leads to quicker corrective actions, improving the yield and increasing profit.

Unfortunately, spatial signature analysis has been an inflexible process, and often has a tendency to over-analyze defects individually, and do so repeatedly, without recognizing the patterns of defects that may be present. Thus, spatial signature analysis typically has a problem determining the nature of defects, tends to take too long, and is not expandable or reconfigurable beyond its originally-implemented capabilities and parameters.

Previous systems have used parametric rules with wafer signatures. In a previous example, a pixel level signature analysis platform detected signatures either by setting up a series of parametric rules or by using a pattern template. The parametric search was limited to basic mathematically-describable shapes. Independent rules were configured for each shape, which led to overfitting or missed detection. In addition, most process signatures cannot be defined by using simple rules such as lines, arcs, and circles. A template search was used to address complex shapes, but this was limited by the template defined by a user. Critical signatures encompass several variations in shape, size, density, and completeness. These previous parametric rules delayed finding impacted wafers and any root cause analysis, which reduced yield for the semiconductor manufacturer.

Therefore, improved methods and systems are needed.

BRIEF SUMMARY OF THE DISCLOSURE

A method is provided in a first embodiment. The method includes receiving, at a processor a wafer map, wherein the wafer map is for a surface of an entire wafer. The processor is configured to run a machine learning based model for classifying the wafer map. The wafer map is classified using the machine learning based model and a signature on the wafer map. The machine learning based model uses transfer learning.

The method can further include determining a confidence level for the classifying. The confidence level is based on criticality of a defect in the signature.

The method can further include sending an alert if the signature is outside of a confidence level.

The method can further include receiving a plurality of sample wafer maps at the processor, classifying the sample wafer maps based on a root cause of a defect using the processor, and generating a library of sample signatures from the sample wafer maps using the processor. In an instance, images can be extracted from a plurality of defect maps, bin sort maps, and/or metrology maps using the processor and the images can be augmented using the processor. In an instance, training the machine learning based model uses extracted features from the images.

The method can include grouping the wafer map with wafer maps having a same classification.

A system is provided in a second embodiment. The system includes a semiconductor wafer inspection system and a processor in electronic communication with the semiconductor wafer inspection system. The processor is configured to receive a wafer map and classify the wafer map using the machine learning based model and a signature on the wafer map. The wafer map is for a surface of an entire wafer. The processor is configured to run a machine learning based model for classifying the wafer map. The machine learning based model uses transfer learning.

The semiconductor wafer inspection system can include a light source or an electron beam source.

The semiconductor wafer inspection system can generate the wafer map.

The processor can be further configured to determine a confidence level for the classifying. The confidence level can be based on criticality of a defect in the signature.

The processor can be further configured to send an alert if the signature is outside of a confidence level.

The processor can be further configured to receive a plurality of sample wafer maps, classify the sample wafer maps based on a root cause of a defect, and generate a library of sample signatures from the sample wafer maps. In an instance, the processor is further configured to extract images from a plurality of defect maps, bin sort maps, and/or metrology maps and augment the images. In an instance, the processor is further configured to train the machine learning based model using extracted features from the images.

The processor can be further configured to group the wafer map with wafer maps having a same classification.

A non-transitory computer-readable storage medium is provided in a third embodiment. The non-transitory computer-readable storage medium comprises one or more programs for executing the following steps on one or more computing devices. A wafer map is classified using a machine learning based model and a signature on the wafer map. The machine learning based model uses transfer learning. The wafer map is for a surface of an entire wafer.

The steps can further include receiving a plurality of sample wafer maps, classifying the sample wafer maps based on a root cause of a defect, and generating a library of sample signatures from the sample wafer maps.

The steps can further include extracting images from a plurality of defect maps, bin sort maps, and/or metrology maps and augmenting the images.

The steps can further include training the machine learning based model using extracted features from the images.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Figure 5:
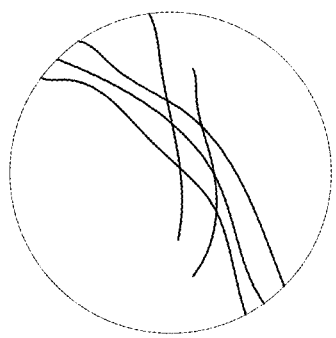
FIG. 5 is an exemplary signature for CMP issues.
Figure 4:
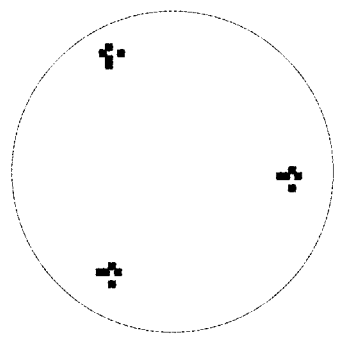
FIG. 4 is an exemplary signature for wafer handler issues.
Figure 6:
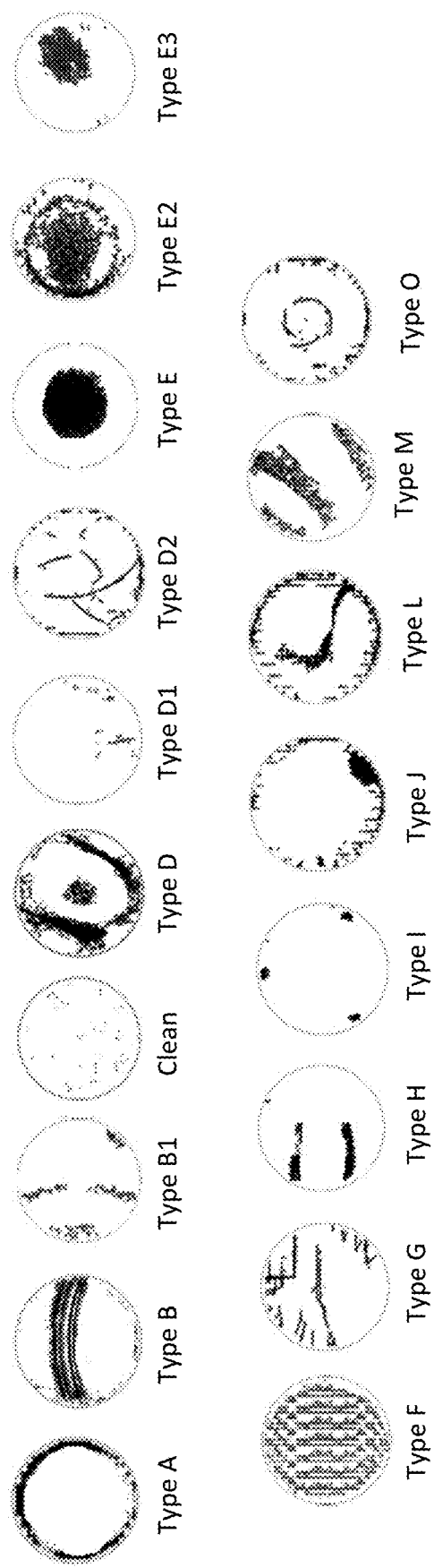
FIG. 6 illustrates other exemplary signatures for various semiconductor manufacturing issues.

Transfer learning and machine learning can be used to automatically classify wafer signatures at a wafer level. Wafer map signatures provide information to semiconductor manufacturers because they aid in root cause analysis. FIG. 4 is an exemplary signature for wafer handler issues showing three points of impact. FIG. 5 is an exemplary signature for CMP issues showing long arc scratches. FIG. 6 illustrates other exemplary signatures for various semiconductor manufacturing issues. Each of these examples has a different source, and quickly identifying the signature on the wafer can help determine a root cause the problem.

Existing applications are either manual or cumbersome to use and do not suffice, especially given the distribution of signature shapes that fall under a single class. Transfer learning can be used to classify multi-label, multi class signatures on wafer maps. This is helpful with varying new signatures that are introduced because retraining is quick and tends to need low computing power.

Figure 7:
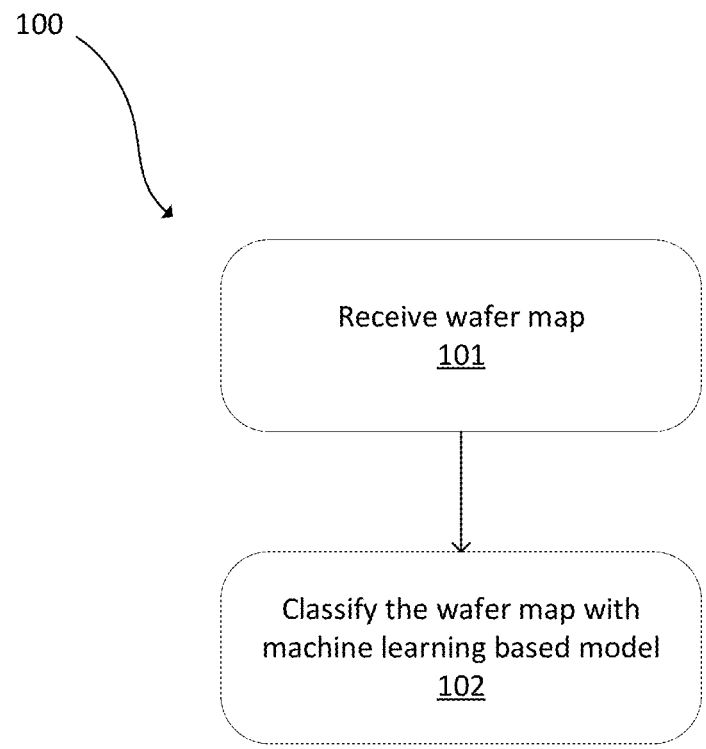
FIG. 7 is a flowchart of an embodiment of a method in accordance with the present disclosure.

FIG. 7 is an embodiment of a method 100. Some or all of the steps of the method 100 can use a processor. At 101, a wafer map is received at a processor. The wafer map is for a surface of an entire wafer, which is shown in the examples of FIGS. 4-6. The surface may be a flat surface of a wafer or a surface which includes devices on the wafer (e.g., dies or integrated circuits). The processor is configured to run a machine learning based model to classify the wafer map.

At 102, the wafer map is classified using the machine learning based model and a signature on the wafer map. The machine learning based model uses transfer learning. A wafer signature can be helpful to semiconductor manufacturers. These can be used to find the root cause of the error. Early detection of a root cause means less wafer scrap. This increases yield for a semiconductor manufacturer. By automating and quantifying signatures, semiconductor manufacturers also can react faster to inline excursions and run root cause analysis.

Figure 2:
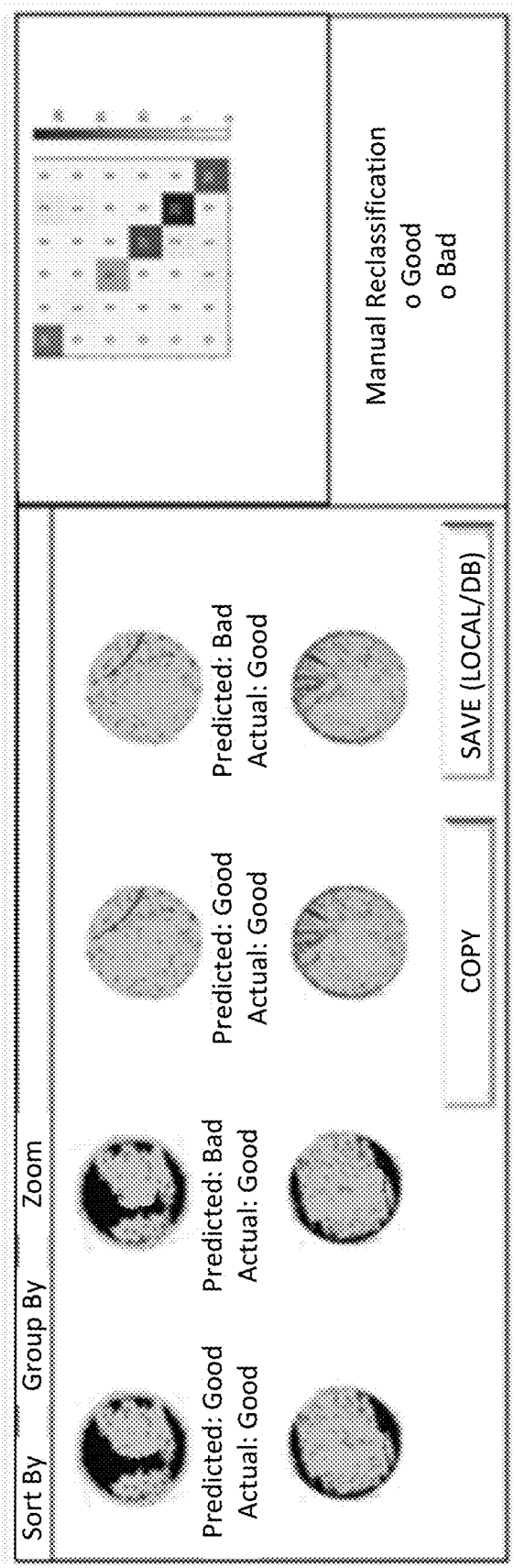
FIG. 2 illustrates an exemplary classification of signatures.
Figure 3:
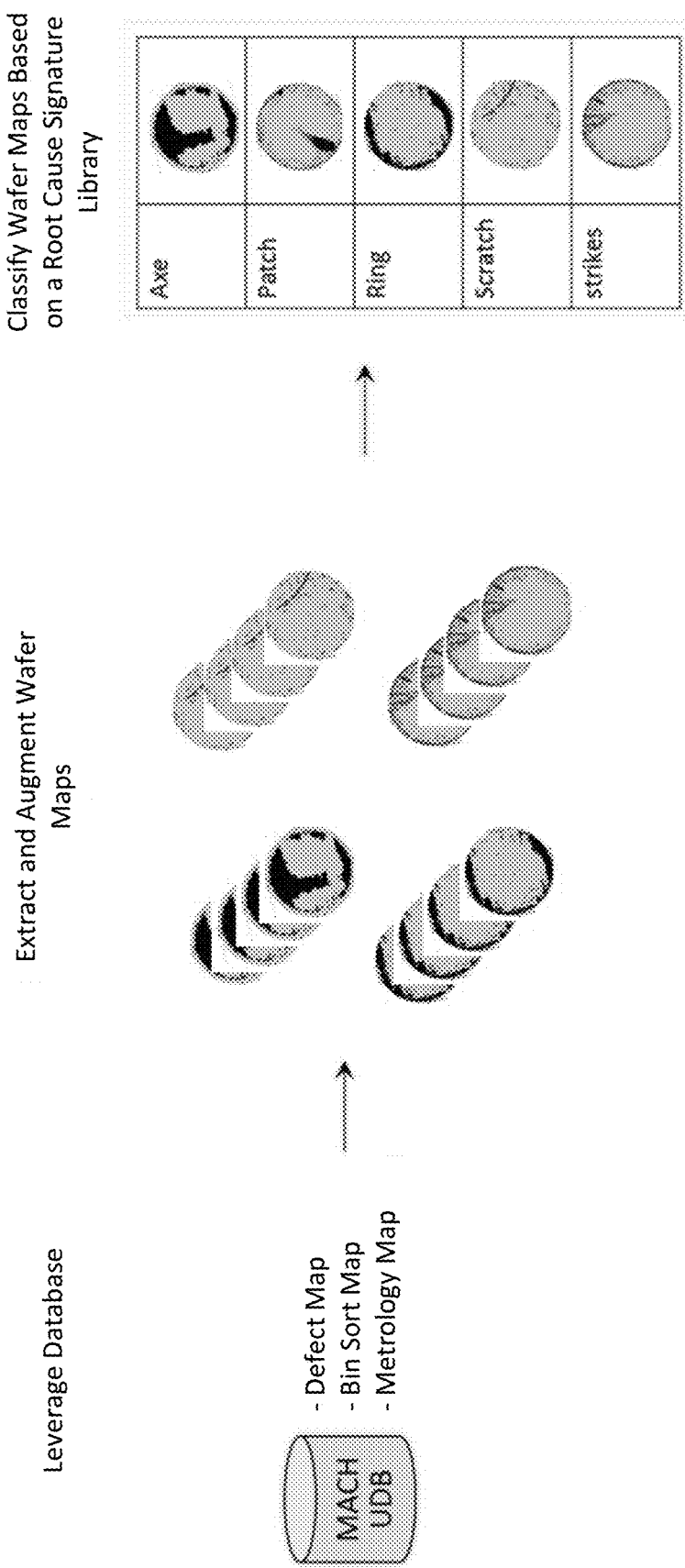
FIG. 3 is a flowchart of signature classification in accordance with the present disclosure.

In an embodiment shown in FIG. 3, sample wafer maps are received. These sample wafer maps are classified based on a root cause of a defect. For example, FIG. 2 illustrates an exemplary classification of signatures. As shown in FIG. 3, a library of sample signatures is generated from the sample wafer maps. The machine learning based model can be trained using extracted features from these images.

In the embodiment of FIG. 3, the images are extracted from defect maps, bin sort maps, and/or metrology maps. A defect map is a wafer map showing detected defect locations. A bin sort map is a wafer map showing the pass/fail status of the dies in the wafer. A metrology map is a wafer map showing measured properties of actual components in the wafer or special target marks placed in the wafer. These images can then be augmented.

Extraction can be performed. A deep neural network can be trained to map images to classes. Intermediate layers of the deep neural network can provide an abstract representation of the image. During extraction, an image is processed and the features are extracted from the output of one of the intermediate layers. If the features are generated using a deep neural network that has been trained on a different image data set, then transfer learning is performed.

Augmentation can be performed. Augmentation includes generating a larger image data set by transforming the original images (i.e., a small data set) in such a way that the original images can be considered different instances. The images are not transformed enough to be considered part of a completely different data set.

Figure 1:
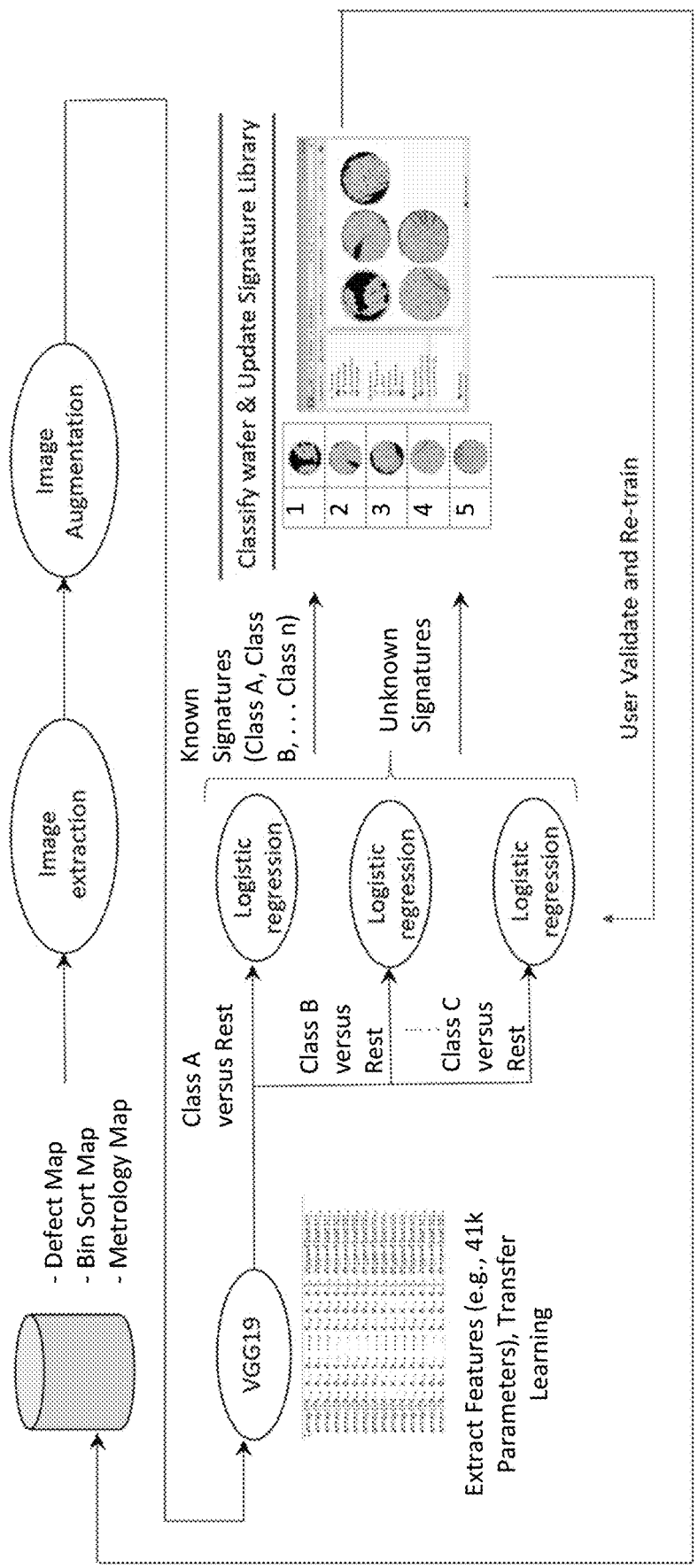
FIG. 1 is a flowchart of an operation in accordance with the present disclosure.

The embodiment of FIG. 3 is further explained using the flowchart of FIG. 1. Features are extracted from the augmented images. These features are then classified and added to the library of sample signatures. A user can validate and/or re-train the machine learning based model based on examples in the library of sample signatures. Manual classification can be used to provide a ground truth. For example, a semiconductor manufacturer can classify one or two examples, and then the machine learning based model can determine the rest. In the example of FIG. 1, the images are classified into classes A-n. The machine learning based model can examine trends, track defect sources, and monitor production. The machine learning based model also can find complex signatures for particular wafer processing steps or tools.

Embodiments of the method 100 can address the range of signatures that are found in a semiconductor manufacturing environment that can impact yield loss due to wafer scraps. Signatures classes can be classified that cannot be defined using existing methods because the input is images instead of data.

In an instance, a confidence level for the classifying can be determined. The confidence level may be based on criticality of a defect in the signature. Excursions from the confidence level can be monitored. For example, an alert can be sent if the signature is outside of a confidence level. Confidence metrics can enable semiconductor manufacturers to control the purity of the signature bin based on its criticality.

In an instance, the wafer map can be grouped with wafer maps having a same classification. Signatures can be grouped based on varying shapes, sizes, and forms organically.

Transfer learning can be used with the machine learning based model. Transfer learning is a machine learning technique in which a model that is trained on one task is re-purposed on a second related task. Transfer learning can enable rapid progress or improved performance when modeling the second task.

Embodiments disclosed herein can enable automatic wafer level signature analysis using a combination of transfer learning and deep learning techniques. In a prototype, signature classes were detected with greater than 80% precision and recall based on initial analysis. In a particular example, approximately 3000 production wafers were analyzed. The purity of signature classes can be controlled by a confidence matrix. The embodiments disclosed herein are applicable in semiconductor manufacturing across wafers, layers, and devices. Tool stability over a period can be monitored.

To train a model to detect CMP issues on a wafer, a model that has been trained on a similar domain (e.g., wafer handling issues) can be used. These types of signatures are shown in FIGS. 4 and 5. In practice, however, a deterioration or collapse in performance can occur because the model inherits the bias of its training data and does not know how to generalize to the new domain. To train a model to perform a new task, such as detecting etch defects, an existing model cannot be reused because the labels between the tasks differ.

In practice, transferring as much knowledge from the source setting to the target task or domain can be beneficial. This knowledge can take on various forms depending on the data. For example, it can pertain to how objects are composed to identification of novel objects.

Transfer learning can handle these scenarios by leveraging the already existing labeled data of some related task or domain. This knowledge gained in solving the source task in the source domain can be stored and applied to the new wafer signatures.

Transfer learning can be generally defined as the improvement of learning in a new task (or a target task) through the transfer of knowledge from a related task that has already been learned (one or more source tasks). In the embodiments described herein, training the machine learning based model with only the nominal instances involves learning the one or more source tasks, and re-training the machine learning based model with the non-nominal instances transfers the knowledge from the source tasks (the nominal instances) to the target task (the non-nominal instances). In transfer learning, the agent knows nothing about a target task (or even that there will be a target task) while it is learning a source task. For instance, in the embodiments described herein, the machine learning based model knows nothing about the new signatures while it is being trained with the previous data. In general, however, the transfer learning described herein may be performed in any suitable manner known in the art.

Inductive transfer can be viewed as not only a way to improve learning in a standard supervised-learning task, but also as a way to offset the difficulties posed by tasks that involve relatively small datasets. That is, if there are relatively small amounts of data or class labels for a task, treating it as a target task and performing inductive transfer from a related source task can lead to more accurate models. These approaches can use source-task data to enhance target-task data, despite the fact that the two datasets are assumed to come from different probability distributions. Transfer learning as described herein can be further performed as described in U.S. Pub. No. 20170193400, which is incorporated by reference as if fully set forth herein. The embodiments described herein may be further configured as described in this patent application and the relevant references disclosed therein.

The re-training (and training) architecture used by the embodiments described herein can be designed to converge to the ground truth (for validation samples) with the minimum number of samples. In an embodiment, the one or more components include one or more additional components, the re-training is performed using the one or more additional components. The one or more additional components can include a common mother network for all layers on the specimens, a grand common mother network for all layers on the specimens, or other components. For example, the transfer learning methods may be applied to the training set(s) generated using any of the transfer learning training input generation methods described herein to train the machine learning based models.

In an instance, a deep neural network (e.g., a VGG19 Deep Neural Network) is used to extract a feature vector from a wafer map. The deep neural network can be followed by a series of logistic regression models to perform classification. The deep neural network can be the machine learning based model.

Generally speaking, "deep learning" (also known as deep structured learning, hierarchical learning or deep machine learning) is a branch of machine learning based on a set of algorithms that attempt to model high level abstractions in data. In a simple case, there may be two sets of layers: ones that receive an input signal and ones that send an output signal. When the input layer receives an input, it passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

Research in this area attempts to make better representations and create models to learn these representations from large-scale unlabeled data. Some of the representations are inspired by advances in neuroscience and are loosely based on interpretation of information processing and communication patterns in a nervous system, such as neural coding which attempts to define a relationship between various stimuli and associated neuronal responses in the brain.

In some embodiments, the deep learning model is a generative model. A "generative" model can be generally defined as a model that is probabilistic in nature. The generative model can be learned (in that its parameters can be learned) based on a suitable training set of data. In an embodiment, the deep learning model is configured as a deep generative model. For example, the model may be configured to have a deep learning architecture in that the model may include multiple layers, which perform a number of algorithms or transformations.

In another embodiment, the deep learning model is configured as a neural network. In a further embodiment, the deep learning model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In one embodiment, the information includes a classification for a defect detected on the specimen. In one such embodiment, the deep learning model is configured as an AlexNet. For example, an AlexNet includes a number of convolutional layers (e.g., 5) followed by a number of fully connected layers (e.g., 3) that are, in combination, configured and trained to classify images.

In another such embodiment, the deep learning model is configured as a GoogleNet. For example, a GoogleNet may include layers such as convolutional, pooling, and fully connected layers such as those described further herein configured and trained to classify images. While the GoogleNet architecture may include a relatively high number of layers, some of the layers may be operating in parallel, and groups of layers that function in parallel with each other are generally referred to as inception modules. Other of the layers may operate sequentially. Therefore, GoogleNets are different from other neural networks described herein in that not all of the layers are arranged in a sequential structure.

In a further such embodiment, the deep learning model is configured as a VGG network. For example, VGG networks were created by increasing the number of convolutional layers while fixing other parameters of the architecture. Adding convolutional layers to increase depth is made possible by using substantially small convolutional filters in all of the layers. Like the other neural networks described herein, VGG networks were created and trained to classify images. VGG networks also include convolutional layers followed by fully connected layers. Examples of neural networks configured as VGG are described in "Very Deep Convolutional Networks for Large-Scale Image Recognition," by Simonyan et al., ICLR 2015, which is incorporated by reference as if fully set forth herein. The deep learning models described herein may be further configured as described in this reference.

In some such embodiments, the deep learning model is configured as a deep residual network. For example, like some other networks described herein, a deep residual network may include convolutional layers followed by fully connected layers, which are, in combination, configured and trained for image classification. In a deep residual network, the layers are configured to learn residual functions with reference to the layer inputs, instead of learning unreferenced functions. In particular, instead of hoping each few stacked layers directly fit a desired underlying mapping, these layers are explicitly allowed to fit a residual mapping, which is realized by feedforward neural networks with shortcut connections. Shortcut connections are connections that skip one or more layers. A deep residual net may be created by taking a plain neural network structure that includes convolutional layers and inserting shortcut connections which thereby takes the plain neural network and turns it into its residual learning counterpart.

In a further such embodiment, the deep learning model includes one or more fully connected layers configured for classifying defects on the specimen. A "fully connected layer" may be generally defined as a layer in which each of the nodes is connected to each of the nodes in the previous layer. The fully connected layer(s) may perform classification based on the features extracted by convolutional layer(s), which may be configured as described further herein. The fully connected layer(s) are configured for feature selection and classification. In other words, the fully connected layer(s) select features from a feature map and then classify the defects in the image(s) based on the selected features. The selected features may include all of the features in the feature map (if appropriate) or only some of the features in the feature map.

If the deep learning model outputs a classification for a defect detected on the specimen, the deep learning model may output an image classification, which may include a classification result per image with a confidence associated with each classification result. The results of the image classification can also be used as described further herein. The image classification may have any suitable format (such as an image or defect ID, a defect description such as "pattern," "bridge," etc.). The image classification results may be stored and used as described further herein.

In some embodiments, the information determined by the deep learning model includes features of the images extracted by the deep learning model. In one such embodiment, the deep learning model includes one or more convolutional layers. The convolutional layer(s) may have any suitable configuration known in the art and are generally configured to determine features for an image as a function of position across the image (i.e., a feature map) by applying a convolution function to the input image using one or more filters. In this manner, the deep learning model (or at least a part of the deep learning model) may be configured as a convolution neural network (CNN). For example, the deep learning model may be configured as a CNN, which is usually stacks of convolution and pooling layers, to extract local features. The embodiments described herein can take advantage of deep learning concepts such as a CNN to solve the normally intractable representation inversion problem. The deep learning model may have any CNN configuration or architecture known in the art. The one or more pooling layers may also have any suitable configuration known in the art (e.g., max pooling layers) and are generally configured for reducing the dimensionality of the feature map generated by the one or more convolutional layers while retaining the most important features.

The features determined by the deep learning model may include any suitable features described further herein or known in the art that can be inferred from the input described herein (and possibly used to generate the output described further herein). For example, the features may include a vector of intensity values per pixel. The features may also include any other types of features described herein, e.g., vectors of scalar values, vectors of independent distributions, joint distributions, or any other suitable feature types known in the art.

In general, the deep learning model described herein is a trained deep learning model. For example, the deep learning model for which one or more diagnostic functions are performed may be previously trained by one or more other systems and/or methods. In addition, the deep learning model may be trained by one or more of the embodiments described herein before the one or more diagnostic functions are performed for the deep learning model. In this manner, the diagnostic functions described herein are unlike deep learning model characterizations that are performed during training of a deep learning model in that in the embodiments described herein, the deep learning model is already generated and trained and then the functionality of the model is determined as described herein, which can then be used to perform one or more additional functions for the deep learning model.

Figure 8:
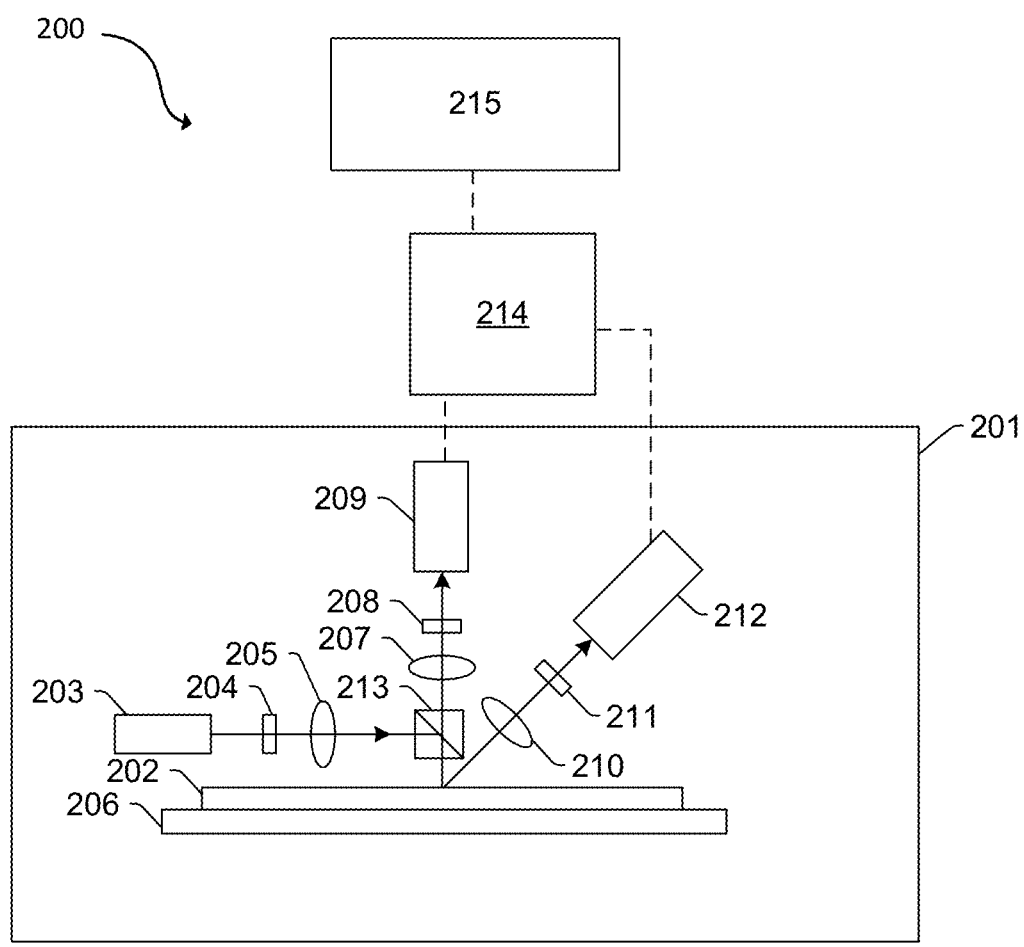
FIG. 8 is an embodiment of a system in accordance with the present disclosure.

One embodiment of a system 200 is shown in FIG. 8. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen 202 includes a reticle. The reticle may include any reticle known in the art.

In the embodiment of the system 200 shown in FIG. 8, optical based subsystem 201 includes an illumination subsystem configured to direct light to specimen 202. The illumination subsystem includes at least one light source. For example, as shown in FIG. 8, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 8, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 8. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 8 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 8) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 8 as a single refractive optical element, it is to be understood that, in practice, lens 205 may include a number of refractive and/or reflective optical elements that in combination focus the light from the optical element to the specimen. The illumination subsystem shown in FIG. 8 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 8 includes two detection channels, one formed by collector 207, element 208, and detector 209 and another formed by collector 210, element 211, and detector 212. As shown in FIG. 8, the two detection channels are configured to collect and detect light at different angles of collection. In some instances, both detection channels are configured to detect scattered light, and the detection channels are configured to detect light that is scattered at different angles from the specimen 202. However, one or more of the detection channels may be configured to detect another type of light from the specimen 202 (e.g., reflected light).

As further shown in FIG. 8, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 8 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 8 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 8 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 8 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with a scanning electron microscope.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be configured according to any of the embodiments described herein. The processor 214 also may be configured to perform other functions or additional steps using the output of the system 200 or using images or data from other sources.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 is configured to perform embodiments of the method 100. The processor 214 can operate the machine learning based model in an instance. The system 200 can inspect wafers for defects, the results of which can be used to generate the wafer maps received at the processor 214.

An additional embodiment relates to a non-transitory computer-readable medium storing program instructions executable on a controller for performing a computer-implemented method for classifying a wafer map, as disclosed herein. In particular, as shown in FIG. 8, electronic data storage unit 215 or other storage medium may contain non-transitory computer-readable medium that includes program instructions executable on the processor 214. The computer-implemented method may include any step(s) of any method(s) described herein, including method 100.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

While the system 200 uses light, the method 100 can be performed using a different semiconductor inspection tool. For example, the method 100 can be performed using results from a system that uses an electron beam, such as a scanning electron microscope, or an ion beam. Thus, the system can have an electron beam source or an ion beam source.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
   receiving, a wafer map at a processor, wherein the wafer map is for a surface of an entire wafer, wherein the processor is configured to run a machine learning based model for classifying the wafer map;
   classifying the wafer map using the machine learning based model and a signature on the wafer map, wherein the machine learning based model uses transfer learning, and wherein a confidence matrix is used to control purity of signature classes in the machine learning based model;
   determining a confidence level for the classifying, wherein the confidence level is based on criticality of a defect in the signature; and
   determining if the signature is outside of the confidence level.

2. The method of claim 1, further comprising sending an alert if the signature is outside of the confidence level.

3. The method of claim 1, further comprising:
   receiving a plurality of sample wafer maps at the processor;
   classifying the sample wafer maps based on a root cause of a defect using the processor; and
   generating a library of sample signatures from the sample wafer maps using the processor.

4. The method of claim 3, further comprising:
   extracting images from a plurality of defect maps, bin sort maps, and/or metrology maps using the processor; and
   augmenting the images using the processor.

5. The method of claim 4, further comprising training the machine learning based model using extracted features from the images.

6. The method of claim 1, further comprising grouping the wafer map with wafer maps having a same classification.

7. A system comprising:
   a semiconductor wafer inspection system; and
   a processor in electronic communication with the semiconductor wafer inspection system,
      wherein the processor is configured to:
      receive a wafer map, wherein the wafer map is for a surface of an entire wafer, wherein the processor is configured to run a machine learning based model for classifying the wafer map;
      classify the wafer map using the machine learning based model and a signature on the wafer map, wherein the machine learning based model uses transfer learning, and wherein a confidence matrix is used to control purity of signature classes in the machine learning based model;
      determine a confidence level for the classifying, wherein the confidence level is based on criticality of a defect in the signature; and
      determine if the signature is outside of the confidence level.

8. The system of claim 7, wherein the semiconductor wafer inspection system includes a light source or an electron beam source.

9. The system of claim 7, wherein the semiconductor wafer inspection system generates the wafer map.

10. The system of claim 7, wherein the processor is further configured to send an alert if the signature is outside of the confidence level.

11. The system of claim 7, wherein the processor is further configured to:
    receive a plurality of sample wafer maps;
    classify the sample wafer maps based on a root cause of a defect; and
    generate a library of sample signatures from the sample wafer maps.

12. The system of claim 11, wherein the processor is further configured to:
    extract images from a plurality of defect maps, bin sort maps, and/or metrology maps; and
    augment the images.

13. The system of claim 12, wherein the processor is further configured to train the machine learning based model using extracted features from the images.

14. The system of claim 7, wherein the processor is further configured to group the wafer map with wafer maps having a same classification.

15. A non-transitory computer-readable storage medium, comprising one or more programs for executing the following steps on one or more computing devices:
    classifying a wafer map using a machine learning based model and a signature on the wafer map, wherein the machine learning based model uses transfer learning, wherein the wafer map is for a surface of an entire wafer, and wherein a confidence matrix is used to control purity of signature classes in the machine learning based model;
    determining a confidence level for the classifying, wherein the confidence level is based on criticality of a defect in the signature; and
    determining if the signature is outside of the confidence level.

16. The non-transitory computer-readable storage medium of claim 15, wherein the steps further include:
    receiving a plurality of sample wafer maps;
    classifying the sample wafer maps based on a root cause of a defect; and
    generating a library of sample signatures from the sample wafer maps.

17. The non-transitory computer-readable storage medium of claim 16, wherein the steps further include:
    extracting images from a plurality of defect maps, bin sort maps, and/or metrology maps; and
    augmenting the images.

18. The non-transitory computer-readable storage medium of claim 17, wherein the steps further include training the machine learning based model using extracted features from the images.

* * * * *